United States Patent [19]

Hall

[11] Patent Number: 4,745,473
[45] Date of Patent: May 17, 1988

[54] HYBRID IMAGE COMPRESSION SYSTEM

[75] Inventor: Charles F. Hall, Satellite Beach, Fla.

[73] Assignee: Harris Corporation, Melbourne, Fla.

[21] Appl. No.: 843,005

[22] Filed: Mar. 24, 1986

[51] Int. Cl.⁴ .................. H04N 11/06; H04N 7/12
[52] U.S. Cl. ...................... 358/133; 358/13; 358/260
[58] Field of Search ............. 358/133, 138, 13, 260, 358/12, 142; 382/56

[56] References Cited

U.S. PATENT DOCUMENTS

| | | | |
|---|---|---|---|
| 4,096,526 | 6/1978 | Furuta | 358/262 X |
| 4,096,527 | 6/1978 | Furuta | 358/262 X |
| 4,124,870 | 11/1978 | Schatz et al. | 382/56 X |
| 4,266,249 | 5/1981 | Chai et al. | 358/260 |
| 4,344,086 | 8/1982 | Mizuno | 358/261 X |
| 4,420,771 | 12/1983 | Pirsch | 358/133 X |
| 4,476,495 | 10/1984 | Fujisawa et al. | 358/261 X |
| 4,520,506 | 5/1985 | Chan et al. | 358/133 X |
| 4,546,385 | 10/1985 | Anastassiou | 358/260 X |
| 4,597,010 | 6/1986 | Carr | 358/133 |
| 4,651,193 | 3/1987 | Catros | 358/13 |
| 4,672,441 | 6/1987 | Hoelzlwimmer et al. | 358/135 |

OTHER PUBLICATIONS

"Adaptive Quantization of Picture Signals Using Spatial Masking", A. N. Netravali and B. Prasada, Pro. IEEE, vol. 65, pp. 536-548, Apr. 1977.

"A Nonlinear Model for the Spatial Characteristics of the Human Visual System", C. F. Hall and E. L. Hall, IEEE Trans. Systems, Man and Cybernetics, vol. SMC-7, No. 3, pp. 161-170, Mar. 1977.

"Image Coding by Linear Transformation and Block Quantization", A. Habibi and P. A. Wintz, IEEE Trans. Commun. Tech., vol. COM-19, No. 1, pp. 50-62, Jan. 1971.

"Picture Coding", A Review, A. N. Netravali and J. O. Limb, Proc. IEEE, vol. 68, No. 3, pp. 366-406, Mar. 1980.

"Image Data Compression: A Review", A. K. Jain, Proc. IEEE, vol. 69, No. 3, pp. 349-389, Mar. 1981.

"Quantizing for Minimum Distortion", J. Max, IRE Trans. Info. Th., vol. IT-6, No. 1, pp. 7-12, Mar. 1960.

Primary Examiner—James J. Groody
Assistant Examiner—Victor R. Kostak
Attorney, Agent, or Firm—Antonelli, Terry & Wands

[57] ABSTRACT

A bandwidth reduction system which encodes images without significant degradation of edge information. A PCM encoded signal, which may be an image generated by the sampling of a video signal or of other format is separated into two channels in which the upper bit plane is processed in one channel by an entropy preserving encoding process and the lower bit planes are processed in the other channel by a nonentropy preserving encoding process. The resultant signals are recombined to reconstitute each sample into a multibit PCM signal with reduced bandwidth which retains significant edge information.

19 Claims, 1 Drawing Sheet

HYBRID IMAGE COMPRESSION SYSTEM

BACKGROUND OF THE INVENTION

1. Field of the Invention

The present invention relates to bandwidth reduction techniques for encoding images which preserves image edges with high contrast.

2. Description of the Prior Art

Many bandwidth compression techniques which have been applied to processing images can be characterized as low pass filters. High bandwidth compression rates yield images with reduced spatial resolution or sharpness. In general, the sharpness in an image is a function of high contrast edges.

Extensive studies on the effects of edges on the sensitivity of human visual perception to luminance differences have been performed. See T. N. Cornsweet, *Visual Perception*, New York: Academic Press, pp. 270–276, 1970; E. Aulhorn and H. Harms, "Visual Perimetry," in *Handbook of Sensory Physiology*, Vol. VII/4, D. Jameson and L. M. Hurvich, Ed., New York: Springer-Verlag, 1972; and C. H. Graham, "Visual Form Perception," in *Vision and Visual Perception*, C. H. Graham, Ed., New York: John Wiley, 1965. The implication is that the presence of these edges is important to overall subjective quality of the image but their fidelity is not. This characteristic has been used in the development of adaptive quantizers for image compression. See A. N. Netravali and B. Prasada, "Adaptive Quantization of Picture Signals Using Spatial Masking", *Pro. IEEE*, Vol. 65, pp. 536–548, April 1977.

Research results from psychophysical and physiological investigations of the human visual system have been used to develop a model of the human visual system and to apply it to the encoding problem. See C. F. Hall and E. L. Hall, "A Nonlinear Model for the Spatial Characteristics of the Human Visual System," *IEEE Trans. Systems, Man and Cybernetics*, Vol. SMC-7, No. 3, pp. 161–170, March 1977; C. F. Hall, *Digital Color Image Compression in a Perceptual Space*, Ph.D. Dissertation, University of Southern California, USCIPI Report 790, February 1978; and C. F. Hall, "The Application of Human Visual System Models to Digital Color Image Compression," *Proc. IEEE International Conf. on Communications*, Boston, 1983. The basic objective of the aforementioned three studies was to put any encoding noise where it could not be seen. When difference images of the original and encoded/decoded images were computed, the noise was concentrated around the high contrast edges.

Several bandwidth compression techniques have been applied to the processing of images. See C. F. Hall, *Digital Color Image Compression in a Perceptual Space*, Ph.D. Dissertation, University of Southern California, USCIPI Report 790, February 1978; C. F. Hall, "The Application of Human Visual System Models to Digital Color Image Compression," *Proc. IEEE International Conf. on Communications*, Boston, 1983; E. L. Hall, *Computer Image Processing and Recognition*, New York: Academic Press, 1979; A. Habibi and P. A. Wintz, "Image Coding by Linear Transformation and Block Quantization," *IEEE Trans Commun. Tech.*, Vol. COM-29, No. 1, pp. 50–62, January 1971; A. N. Netravali and J. O. Limb, "Picture Coding: A Review," *Proc. IEEE*, Vol. 68, No. 3, pp. 366–406, March 1980; and A. K. Jain, "Image Data Compression: A Review," *Proc. IEEE*, Vol. 69, No. 3, pp. 349–389, March 1981.

The encoding process can be thought of as a three-step process which involves a mapper, a quantizer, and an encoder. The purpose of the mapper is to transform the pixel data into another domain where the efficiency of the quantizer is enhanced, thus fewer bits are required to encode the data. The quantizer performs the bit reduction task by assigning the mapped data to a smaller number of possible values than contained in the input. Finally, the encoder assigns a code word to the quantizer output values.

The time discrete, amplitude discrete representation of data is referred to as pulse code modulation (PCM). This technique in its simplest form, involves the sampling of an analog signal at a uniform rate (the mapper), mapping these samples to one of N equally spaced values (the quantizer), and assigning a unique binary representation to each possible quantizer value (the encoder). This technique requires 6–7 bits per pixel for most images. PCM usually proceeds the more sophisticated forms of encoding and may, for example, require 8 bits to encode individual pixels. The PCM technique is simply an analog to digital conversion and is relatively inefficient since no attempt is made to use any redundancy in the data. Imagery is highly correlated and several types of mappers designed to take advantage of this redundancy have been used such as differencing, orthogonal transforming and run length encoding.

The potential value of encoding pixel differences is apparent when a histogram of adjacent pixel differences is computed. Input amplitudes for a typical image may range up to 256 gray levels, whereas, the difference range is about 16 levels. Thus, the possible reduction in word size alone can yield a 2:1 compression. A practical implementation of this approach is the differential pulse code modulator (DPCM). In DPCM the difference between the current pixel value and a predicted value is quantitized and encoded. The mapper in this case consists of a predictor and a differencing operation. Several variations are possible. The predictor may be one-, two- or three-dimensional, linear or non-linear, adaptive, or nonadaptive, and use one or more pixels in each direction to form the estimate. For single frame images, a simple, two-dimensional, linear, nonadaptive predictor based on the previous pixel and the pixel above the current value to be predicted works quite well. DPCM is limited to a minimum average bit rate of one bit/pixel (sometimes referred to as Delta Modulation).

The linear transformation mappers have a minimum rate restriction based on block size. The image is partitioned into sub-images and each sub-image is transformed into a block of coefficients which are uncorrelated. This permits quantization of each coefficient on an independent basis. Transformations which pack information into a small number of coefficients make large rate reductions possible. The discrete Fourier and cosine transforms have been used and rates as low as 0.1 bit/pixel have been reported. See C. F. Hall, *Digital Color Image Compression in a Perceptual Space*, Ph.D. Dissertation, University of Southern California, USCIPI Report 790, February 1978 and C. F. Hall, "The Application of Human Visual System Models to Digital Color Image Compression," *Proc. IEEE International Conf. on Communications*, Boston, 1983. Most transform encoders delete high frequency coefficients which have low information content (usually established by some type of variance criterion). As a result, they can be modeled as low pass filters. With a run length encoder as a mapper, the sequence of pixel's values along a scan is mapped into a sequence of pairs. Each pair, in sequence, denotes the current gray level value and the number of continuous pixels (run length) with that value. Highly correlated data produces long run lengths and concomitant rate reductions. This procedure works well on bi-level imagery which contains large runs of black and/or white (for example, printed text or fingerprints).

A quantizer as a device which forces each input value to one of a limited number of output values. The optimal design, based on the statistics of the data and mean square error (mse), is the MAX quantizer. See J. Max, "Quantizing for Minimum Distortion," *IRE Trans. Info. Th.*, Vol. IT-6, No. 1, pp. 7–12, March 1960. If the data are uniformly distributed, the reconstruction levels are equally spaced. Other distributions will yield output levels that have the smallest step sizes and the most probable value reasons. Within the DPCM encoder, the major portion of the compression is obtained in the quantizer stage since the different signal is encoded with fewer bits than the input signal contained. Three types of degradations can be generated in the imagery as a result of this approach; granular noise, edge busyness, and slope overload. If the quantizer's steps are too large, the coarse quantization will add random (or granular) noise to regions of constant gray level. If the step size is made small, to minimize this problem, the high contrast edges will require several samples for the output to follow the input. This is referred to as slope overload and it results in smooth edges or low pass filtering effect. Edge busyness occurs when the contrast of an edge changes slowly and the quantizer output dithers about the input value. The selection of a fixed step size usually requires a compromise in one or all of these areas. Ideally, one would like a small step in constant gray in relatively small areas and larger steps in high contrast areas. The probability density for the error signal in DPCM can be approximated by Laplacian density. The optimal quantizer in terms of mse has steps that increase in size as the input increases in magnitude. Thus, granular noise and slope overload effects are minimized. It should be noted that the number of output levels remains fixed for all mapper output values in the DPCM case.

Unlike DPCM, transform encoders use multiple level quantizers. Indeed, the bulk of the compression realizes through not transmitting any value (or at least zeros) for a large number of transform coefficients. Given the total number of bits to be used, the idea is to allocate them in a way that minimizes total distortion. The problem becomes one of selecting the best bit map. Once the bit allocation is determined, a MAX quantizer can be designed for each of the transform coefficients. The Gaussian density is a good model for most coefficients, except the DC term which is more appropriately a Rayleigh.

A good synopsis of the work reported in the literature is set forth in A. N. Netravali and J. O. Limb, "Picture Encoding: A Review," *Proc. IEEE*, Vol. 68, No. 3, pp. 366–406, March 1980 and A. K. Jain, "Image Data Compression: A Review," *Proc. IEEE*, Vol. 69, No. 3, pp. 349–389, March 1981.

U.S. Pat. Nos. 4,096,526, 4,096,527, 4,344,086, 4,420,771, 4,476,495 and United Kingdom patent 2,035,747 disclose various bandwidth reduction techniques. U.S. Pat. Nos. 4,096,526 and 4,096,527 address the problem of handling flag bits in a run length encoding system. U.S. Pat. No. 4,344,086 discloses a predictive encoder for generating an error output signal which is subjected to run length encoding. U.S. Pat. No. 4,420,771, which is similar to U.S. Pat. No. 4,344,086 discloses a DPCM encoder which produces an error signal which is subjected to run length encoding. United Kingdom patent 2,035,747 discloses separate run length encoders for each bit plane.

SUMMARY OF THE INVENTION

The present invention is a bandwidth reduction system for images, such as video, which produces an encoded signal which may be reproduced with high quality edges while achieving substantial bandwidth reduction. The present invention utilizes the fact that high contrast edge information can be isolated in the upper bit plane (the most significant bit) of most types of imagery. The preferred embodiment of the invention codes the upper bit plane with an entropy preserving encoding technique (noiseless encoding) such as simple run length encoding which can be used to preserve the location and approximate peak amplitude of the edge information at an overhead cost of less than 0.1 per pixel. The preferred embodiment encodes the remaining bit planes with non-entropic encoding processes to achieve substantial bandwidth reduction. The resultant imaging encoding system with entropic encoding of the upper bit plane and nonentropic encoding of the one or more lower bit planes provides images with subjective quality improvements of better than 2:1.

A system for encoding images with reduced bandwidth in accordance with the invention comprises an image input source of a PCM encoded image comprised of a plurality of samples each having a plurality of bits to encode each sample, the plurality of bits encoding each sample having an upper bit plane containing information defining edges of the image and one or more lower bit planes containing information of shape and contrast of the image; a separator for processing each encoded sample into first and second processing channels with the first channel processing the upper bit plane and the second channel processing the one or more lower bit planes; the first channel containing an encoder for encoding the upper bit plane of each sample by an entropy encoding process which reduces the bandwidth necessary to transmit the upper bit plane of successive samples; the second channel containing an encoder for encoding the one or more lower bit planes of each sample by a nonentropy encoding process which reduces the bandwidth necessary to transmit the one or more lower bit planes of successive samples and a combiner coupled to the encoders of the first and second channels to recombine the encoded upper bit plane and the encoded one or more lower bit planes of each sample to produce a composite signal. The encoder of the first channel may utilize any known entropy encoder including, but not limited to, a Huffman encoding process, a run length encoding process; or a B encoding process. The encoder of the second channel may utilize any nonentropy encoder including, but not limited to, a DPCM encoding process; a transform encoding process; or a Delta Modulation encoding process.

Furthermore, a system in accordance with the invention for encoding color video images with reduced bandwidth comprises a color video image source of a color signal having a luminance component and two chrominance components with the liminance component being PCM encoded and comprised of a plurality of samples each having a plurality of bits, the plurality of bits encoding each sample having an upper bit plane containing information defining edges of the image and one or more lower bit planes containing shape and contrast; an encoder for encoding the chrominance components by an encoding process which reduces the bandwidth to transmit the chrominance components; a separator for separating each PCM encoded luminance sample into first and second processing channels with the first channel encoding the upper bit plane and the second channel processing the one or more lower bit planes; the first channel containing a processor for encoding the upper bit plane of each sample by an entropy encoding process which reduces the bandwidth necessary to transmit the upper bit plane of the secessive samples; the second channel containing an encoder for encoding the one or more lower bit planes of each sample by a nonentropy encoding process which reduces the bandwidth necessary to transmit the one or more lower bit planes of secessive samples; and a combiner coupled to the encoders of the first and second channels to recombine the encoded upper bit plane and encoded one or more lower bit planes of each sample to produce a composite signal.

As used herein, the terminology "entropy encoding" means a noiseless encoding technique for encoding with bandwidth reduction which permits the recreation of the signal which was encoded without the introduction of noise and the terminology "nonentropy encoding" means a bandwidth reduction encoding technique which introduces noise which prevents a noiseless recreation of the signal being encoded.

DESCRIPTION OF THE PREFERRED EMBODIMENTS

The invention utilizes the discovery that the presence of edges is important to the overall subjective quality of the image, but their fidelity is not. Thus, encoding of the most significant bit of the edge information with an entropy preserving encoding process produces an overall image having a subjective quality which is acceptable to the viewer. However, the introduction of noise into the upper bit plane contributes to the overall lessening of the quality of the recreated image.

Figure 1:
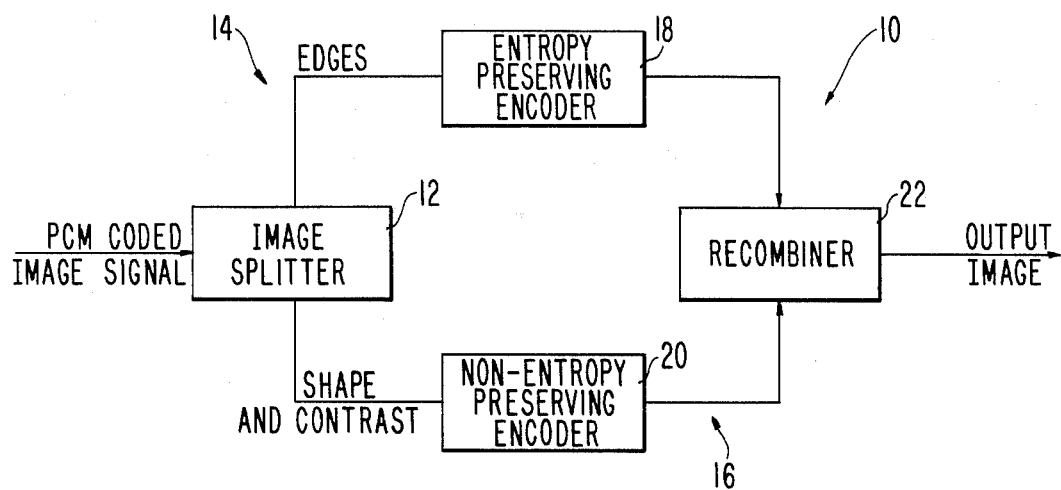
FIG. 1 is a block diagram of a first embodiment of the present invention which is useful for encoding black and white images.

FIG. 1 illustrates a first embodiment 10 in accordance with the present invention which is used for encoding images containing only black and white information. A PCM encoded input image signal having a plurality of bit planes is applied to an image splitter 12 which separates the PCM encoded image signal into two channels. The PCM encoded signal is a multibit signal which may have eight or more bits for encoding the amplitude of each sample which has been taken from an analog signal which was sampled to generate the PCM signal. The upper bit plane is separated and applied to channel 14. The one or more lower bit planes are applied to channel 16. High contrast edge information in most types of images is substantially isolated in the upper bit plane which enables preserving of the edges by the usage of an entropy encoding technique for the upper bit plane which does not introduce noise. Shape and contrast information is found in the lower bit planes. Nonentropy encoding processes which do not reproduce the entropy of the lower bit planes without the introduction of noise may be used without causing a serious degradation of the overall quality of the reproduced image. The first channel 14 contains an entropy preserving encoder 18 which is used to process the upper bit plane to code it with an entropy preserving code. Any one of numerous known entropy preserving encoding mechanisms may be used to implement the entropy preserving encoder 18. As defined above, examples include the well-known Huffman, run length and B codes. The second channel 16 contains a nonentropy preserving encoder 20 which encodes the shape and contrast information contained in the one or more lower bit planes (all bits except the most significant bit) with an encoding process which reduces the bandwidth but introduces noise into the encoded information. The introduction of noise in the lower bit planes does not seriously degrade the overall quality of the image. The implementation of the nonentropy preserving encoder 20 is in accordance with any well-known nonentropy preserving encoder. Examples of nonentropy preserving codes are DPCM, transform encoders, and delta encoders, each of which achieve bandwidth reduction but which introduce some noise into the encoded data. The output signals from the entropy preserving encoder 18 and the nonentropy preserving encoder 20 are recombined by a recombiner 22 which reconstitutes each sample into a single composite signal containing the encoded upper and lower bit planes.

Circuitry for implementing the image splitter 12, the entropy preserving encoder 18, nonentropy preserving encoder 20 and recombiner 22, is of conventional design. Alternatively, these elements may be implemented in a suitably programmed microprocessor or mainframe computer.

In a test run with the present invention in accordance with the system of FIG. 1, a 512×512 8-bit PCM image was processed. The first order entropy of the image was 6.76 and the adjacent pixel correlation was 0.978. A run length encoder was used to implement the entropy preserving encoder 18 which produced an overhead associated with the encoding of the upper bit plane at less than 0.1 bits per pixel. A DPCM encoder was provided for implementing the nonentropy preserving encoder 20. A DPCM encoder can provide compression rates of up to 8:1.

Figure 2:
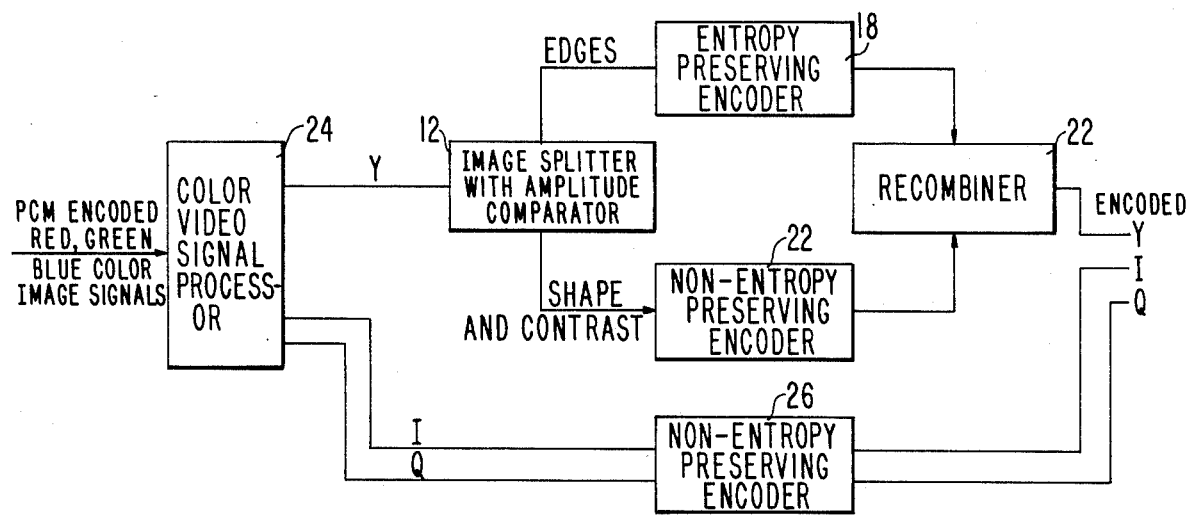
FIG. 2 is a block diagram of a second embodiment of the invention which is useful for encoding a color video signal.

FIG. 2 illustrates a second embodiment of the present invention which is utilized for processing a color video signal. An input signal which consists of red, blue and green components which have been PCM encoded in a manner analogous to the input signal to the system of FIG. 1 is applied to a color video signal processor for producing a luminance component Y and chrominance components I and Q in a manner known in the art. The PCM encoded signal contains a plurality of bit planes in which the highest order bit plane contains edge information and the plurality of lower bit planes contain shape and contrast information. The processing of the chrominance information which consists of the color difference signals is by a nonentropy preserving encoder 26 which is identical to the nonentropy preserving encoder 20 described with reference to FIG. 1, supra. The function of the nonentropy preserving encoder 26 is to significantly reduce the bandwidth of the entire bit plane of the color information. Unlike the processing of the PCM encoded image of FIG. 1, which is split into the upper bit plane which is processed by an entropy preserving encoder and into the lower bit planes which is processed into a nonentropy preserving code, the entire chrominance signal consisting of all of the bit planes is processed in a single encoder which is preferably nonentropy preserving. The luminance signal is processed in a manner identical to FIG. 1 described, supra. Identical reference numbers are used to identify like parts in FIG. 1 and FIG. 2. As has been described, supra, the upper bit plane is processed by an entropy preserving encoder 18 to reduce the bandwidth of the edge information without the introduction of noise and the lower bit planes are processed by the nonentropy preserving encoder 20 to reduce the bandwidth. The resultant signals are recombined to produce a composite signal of an identical number of bits as the input PCM luminance signal.

The present invention may be practiced with any number of bits used to encode the PCM image signal. Moreover, while the PCM signal may be produced by the periodic sampling of any image, the invention is particularly applicable to video signals and digitized image signal used for graphics-type display in creating animation, etc.

While the preferred implementation of the invention utilizes an entropy encoding process to encode edge information and a nonentropy encoding process to encode shape and contrast information, the invention is not limited thereto, but is applicable to other signal processing environments.

While the invention has been described in terms of its preferred embodiments, it should be understood that numerous modifications may be made thereto without departing from the spirit and scope of the invention as defined in the appended claims. It is intended that all such modifications fall within the scope of the claims.

I claim:

1. A system for encoding images with reduced bandwidth comprising:
   (a) an image input signal source of a PCM encoded image comprised of a plurality of samples each having a plurality of bits, the plurality of bits encoding each sample having an upper bit plane containing information defining edges of the image and one or more lower bit planes containing information of shape and contrast of the image;
   (b) means for separating each encoded sample into first and second encoding channels with the first channel encoding the upper bit plane and the second channel encoding the one or more lower bit planes;
   (c) said first channel containing encoding means for encoding the upper bit plane of each sample by an entropy encoding process which reduces the bandwidth necessary to transmit the upper bit plane of successive samples;
   (d) said second channel containing encoding means for encoding the one or more lower bit planes of each sample by a nonentropy encoding process which reduces the bandwidth necessary to transmit the one or more lower bit planes of successive samples; and
   (e) combining means coupled to the encoding means of the first and second channels to recombine the encoded upper bit plane and the encoded one or more lower bit planes of each sample to produce a composite signal.

2. A system in accordance with claim 1 wherein the encoding means of the first channel encodes the upper bit plane with a Huffman encoding process.

3. A system in accordance with claim 1 wherein the encoding means of the first channel encodes the upper bit plane with a run length encoding process.

4. A system in accordance with claim 1 wherein the encoding means of the first channel encodes the upper bit plane with a B encoding process.

5. A system in accordance with claim 1 wherein the encoding means of the second channel encodes the one or more lower bit planes with a DPCM encoding process.

6. A system in accordance with claim 1 wherein the encoding means of the second channel encodes the one or more lower bit planes with a transform encoding process.

7. A system in accordance with claim 1 wherein the encoding means of the second channel encodes the one or more lower bit planes with a delta modulation encoding process.

8. A system in accordance with claim 1 wherein said images are video images.

9. A system for encoding color video images with reduced bandwidth comprising:
   (a) a source of a color video image signal having a luminance component and two chrominance components with the luminance component being PCM encoded and comprised of a plurality of samples each having a plurality of bits, the plurality of bits encoding each sample having an upper bit plane containing information defining edges of the image and one or more lower bit planes containing shape and contrast;
   (b) means for encoding the chrominance components with an encoding process which reduces the bandwidth necessary to transmit the chrominance components;
   (c) means for separating each PCM encoded luminance sample into first and second channels with the first channel encoding the upper bit plane and the second channel encoding the one or more lower bit planes;
   (d) said first channel containing encoding means for encoding the upper bit plane of each sample by an entropy encoding process which reduces the bandwidth necessary to transmit the upper bit plane of successive samples;
   (e) said second channel containing encoding means for encoding the one or more lower bit planes of each sample by a nonentropy encoding process which reduces the bandwidth necessary to transmit the one or more lower bit planes of successive samples; and
   (f) combining means coupled to the encoding means of the first and second channels to recombine the encoded upper bit plane and the encoded one or more lower bit planes of each sample to produce a composite signal.

10. A system in accordance with claim 9 wherein the encoding means of the first channel encodes the upper bit plane with a Huffman encoding process.

11. A system in accordance with claim 9 wherein the encoding means of the first channel encodes the upper bit plane with a run length encoding process.

12. A system in accordance with claim 9 wherein the encoding means of the first channel encodes the upper bit plane with a B encoding process.

13. A system in accordance with claim 9 wherein the encoding means of the second channel encodes the one or more lower bit planes with a DPCM encoding process.

14. A system in accordance with claim 9 wherein the encoding means of the second channel encodes the one or more lower bit planes with a transform encoding process.

15. A system in accordance with claim 9 wherein the encoding means of the second channel encodes the one or more lower bit planes with a delta modulation encoding process.

16. A system in accordance with claim 9 wherein said images are video images.

17. A system further in accordance with claim 9 wherein the encoding process for the chrominance components is an non-entropy encoding process.

18. A system for encoding images with reduced bandwidth comprising
(a) an image input signal source of an image having edge information and shape and contrast information;
(b) means for separating the image input signal into two channels with the first channel containing edge information and the second channel containing shape and contrast information;
(c) said first channel containing encoding means for encoding the edge information with an entropy encoding process which reduces the bandwidth necessary to transmit the edge information;
(d) said second channel containing encoding means for encoding the shape and contrast information with a nonentropy encoding process which reduces the bandwidth necessary to transmit the shape and contrast information; and
(e) combining means coupled to the encoding means of the first and second channels to recombine the encoded edge and shape and contrast information into a composite signal.

19. A system for encoding images in accordance with claim 18 wherein said edge containing information is separated from said contrast and shape containing information by an amplitude comparison means in which high amplitude components are applied to the first channel and lower amplitude components are applied to the second channel.

* * * * *